United States Patent

Royce et al.

[11] Patent Number: 5,376,303
[45] Date of Patent: Dec. 27, 1994

[54] LONG DECAY PHOAPHORS

[75] Inventors: Martin R. Royce; Hiroto Tamaki, both of Lancaster, Pa.; Yoshinori Murazaki, Komatsushima, Japan

[73] Assignee: Nichia Chemical Industries, Ltd., Japan

[21] Appl. No.: 258,304

[22] Filed: Jan. 10, 1994

[51] Int. Cl.$^5$ .............................................. C09K 11/64
[52] U.S. Cl. ........................ 252/301.4 R; 252/301.6 R
[58] Field of Search .................. 252/301.4 R, 301.6 R

[56] References Cited

U.S. PATENT DOCUMENTS

| | | | |
|---|---|---|---|
| 4,783,596 | 11/1988 | Riedner et al. | 252/301.4 R |
| 4,795,588 | 1/1989 | Pet et al. | 252/301.4 R |
| 4.827,187 | 5/1989 | Verlijsdonk | 252/301.4 R |
| 5,273,681 | 12/1993 | Srivastava | 252/301.4 R |

FOREIGN PATENT DOCUMENTS

| | | | |
|---|---|---|---|
| 51-1382 | 1/1976 | Japan | 252/301.4 R |
| 59-102979 | 6/1984 | Japan | 252/301.4 R |
| 60-139785 | 7/1985 | Japan | 252/301.4 R |
| 63-135482 | 6/1988 | Japan | 252/301.4 R |
| 63-191886 | 8/1988 | Japan | 252/301.4 R |

Primary Examiner—Jack Cooper
Attorney, Agent, or Firm—Kenyon & Kenyon

[57] ABSTRACT

Long decay phosphors are disclosed that are comprised of rare-earth activated divalent, boron-substituted aluminates. In particular, the long decay phosphors are comprised of $$MO \cdot a(Al_{1-b}B_b)_2O_3 : cR,$$

wherein
$0.5 \leq a \leq 10.0$,
$0.0001 \leq b \leq 0.5$ and
$0.0001 \leq c \leq 0.2$, MO represents at least one divalent metal oxide selected from the group consisting of MgO, CaO, SrO and ZnO and R represents Eu and at least one additional rare earth element. Preferably, R represents Eu and at least one additional rare earth element selected from the group consisting of Pt, Nd, Dy and Tm.

21 Claims, 5 Drawing Sheets

LONG DECAY PHOAPHORS

FIELD OF INVENTION

This invention relates to long decay phosphors comprised of rare-earth activated, divalent, boron-substituted aluminates and the method of preparing such long decay phosphors.

BACKGROUND OF THE INVENTION

Luminescent materials having a long decay period ranging from a few minutes to several hours are known and typically produce their radiation by phosphorescence. Such phosphorescent materials have typically been used in safety signs or on watch or clock dials. In recent years, technology has developed which makes it possible to imbed luminescent materials in pressed or molded plastic products. Such technology significantly broadens the range of long-decay phosphor applications.

Copper-activated zinc sulfide, such as ZnS:Cu,Cl, is frequently used for these long-decay phosphor applications because copper-activated zinc sulfide produces emission in a spectral region having a relatively high luminous efficiency. However, the properties of copper-activated zinc sulfide are not completely satisfactory since the brightness of the phosphor falls off substantially after extended decay periods, such that the emission is barely perceptible after about 30 to 60 minutes. Furthermore, copper-activated zinc sulfide is subject to degradation and deterioration when exposed to UV radiation in a moist or humid atmosphere. The body color of the material containing the zinc sulfide darkens, possibly due to the presence of elemental zinc on the surface. Use of such materials for outdoor applications has, therefore, been severely limited.

Phosphorescent materials having a long decay period may be used in such fields as the graphic arts, interior decorating or printing inks. For these applications, alkaline-earth sulfide phosphors have been used, since they can be prepared with a broad gamut of colors ranging throughout the visible spectrum from blue to red. These materials, however, are hygroscopic and react readily with moisture tending to generate hydrogen sulfide, a noxious and toxic substance. These properties severely restrict their use in the home.

A long decay phosphor having the composition of $SrAl_2O_4$ activated with $Eu^{2+}$ was reported recently (the 248th Keikoutai Dougakkai Kouen Yokou, Nov. 26, 1993). The composition of that phosphor was not fully disclosed, but it functions as a yellow-green phosphor, very similar to the emission of ZnS:Cu,Cl, and it overcomes some of the disadvantages of ZnS:Cu,Cl. The basic composition of this phosphor is not new, but was disclosed in U.S. Pat. Nos. 3,294,699 and 4,216,408. However, these patents were all directed to phosphors used for designing and making lamps.

$Eu^{2+}$ may produce emission by an indirect transition over a broad spectral range wherein the emission is affected by the preparation conditions and the structure of the host crystal. For example, it is known that emission may be produced by $Eu^{2+}$ all the way from the UV region to the yellow region of the spectrum depending on whether it is present in an aluminate, gallate, borate, phosphate or aluminum gallate host crystal.

Incorporation of rare earth ions in certain zinc sulfide phosphor hosts that have long decay characteristics has also been reported recently, "Study on effect of rare earth in blue-purple night-luminous phosphor CaS: Bi, Cu," Hunan Shifan Daxue, Ziran Kexue Xuebao Vol. 15, No. 2 Page 145–148, 1992 X. Mao, S. Lian and Z. Wu (Hunan Normal Univ., Hunan, CHN); and "Rare earth effect in non-radioactive night luminous phosphor ZnS:Pb,Cu," Hunan Shifan Daxue, Ziran Kexue Xuebao Vol. 14, No. 1, page 47–51, 1991, X. Mai and M. Hong, (Acta Scientiarium Naturalium Univ. Normalis Hunanensis). Such phosphors can be expected to suffer from some of the above-cited disadvantages of other sulfide-based phosphors.

ADVANTAGES AND SUMMARY OF THE INVENTION

The subject invention is directed at providing long-decay phosphors having high initial brightness and long-decay characteristics that overcome the disadvantages of prior art phosphors.

A specific object of the subject invention is to provide phosphors having improved decay characteristics as compared to ZnS:Cu,Cl.

Another object of the subject invention is to provide phosphors having a wide range of colors including, for example, violet, cyan, light-green and yellow-green.

More specifically, the subject invention is directed to long decay phosphors and the method of preparing long decay phosphors comprised of rare-earth activated, divalent, boron-substituted aluminates.

A still more specific object of the subject invention is to provide long decay phosphors that can be tailored to provide the desired color and decay characteristics by adjusting the stoichiometric ratio of divalent metal oxide to boron-substituted aluminum oxide and by selecting the proper combination of rare-earth activators in the subject rare-earth activated, divalent, boron-substituted aluminates.

Still another object of the subject invention is to provide long decay phosphors that may be excited by a variety of excitation sources such as sunlight, artificial light sources, electron beams or x-rays.

Yet another object of the subject invention is to provide long decay phosphors that have no known toxic effects and that are non-hygroscopic so that they may be used for a very wide range of applications, including safe use in the home.

These and still other objects, advantages and benefits may be achieved using a long decay phosphor comprising a composition of

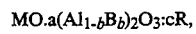

$$MO \cdot a(Al_{1-b}B_b)_2O_3 : cR,$$

wherein
  $0.5 \leq a \leq 10.0$,
  $0.0001 \leq b \leq 0.5$ and
  $0.0001 \leq c \leq 0.2$, MO represents at least one divalent metal oxide selected from the group of oxides consisting of MgO, CaO, SrO and ZnO and R represents Eu and at least one additional rare earth element. More specifically, R represents Eu and at least one additional rare earth element selected from the group consisting of Pr, Nd, Dy and Tm.

Further objects and advantages of the subject invention will be apparent to those skilled in the art from the following detailed description of the disclosed rare-earth activated, divalent, boron-substituted aluminates and method for making the same.

DETAILED DESCRIPTION OF THE PREFERRED EMBODIMENTS

Figure 1:
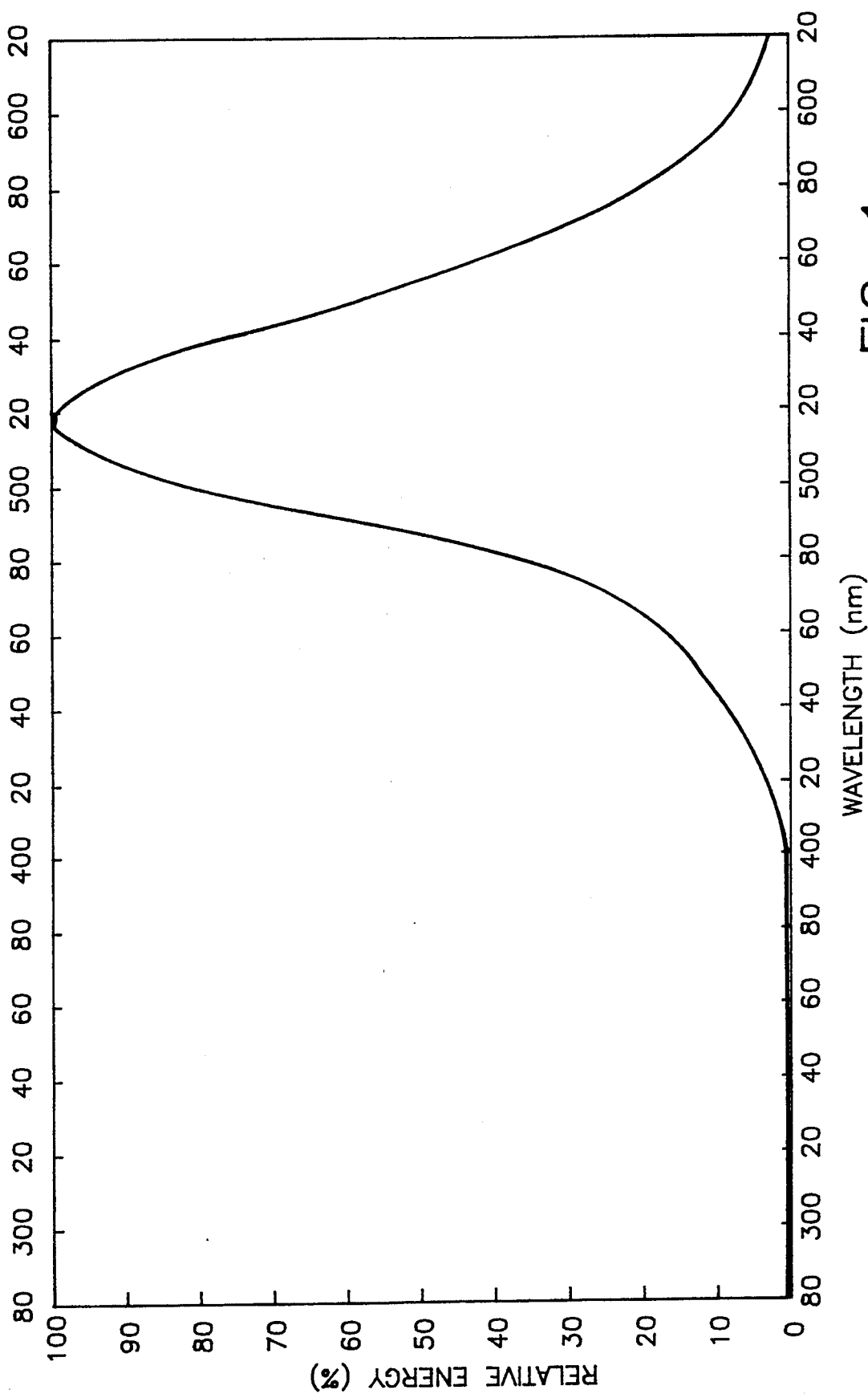
FIG. 1 shows the spectral energy distribution of the emission produced by a reference ZnS:Cu,Cl phosphor when excited by UV radiation at 253.7 nm.
Figure 2:
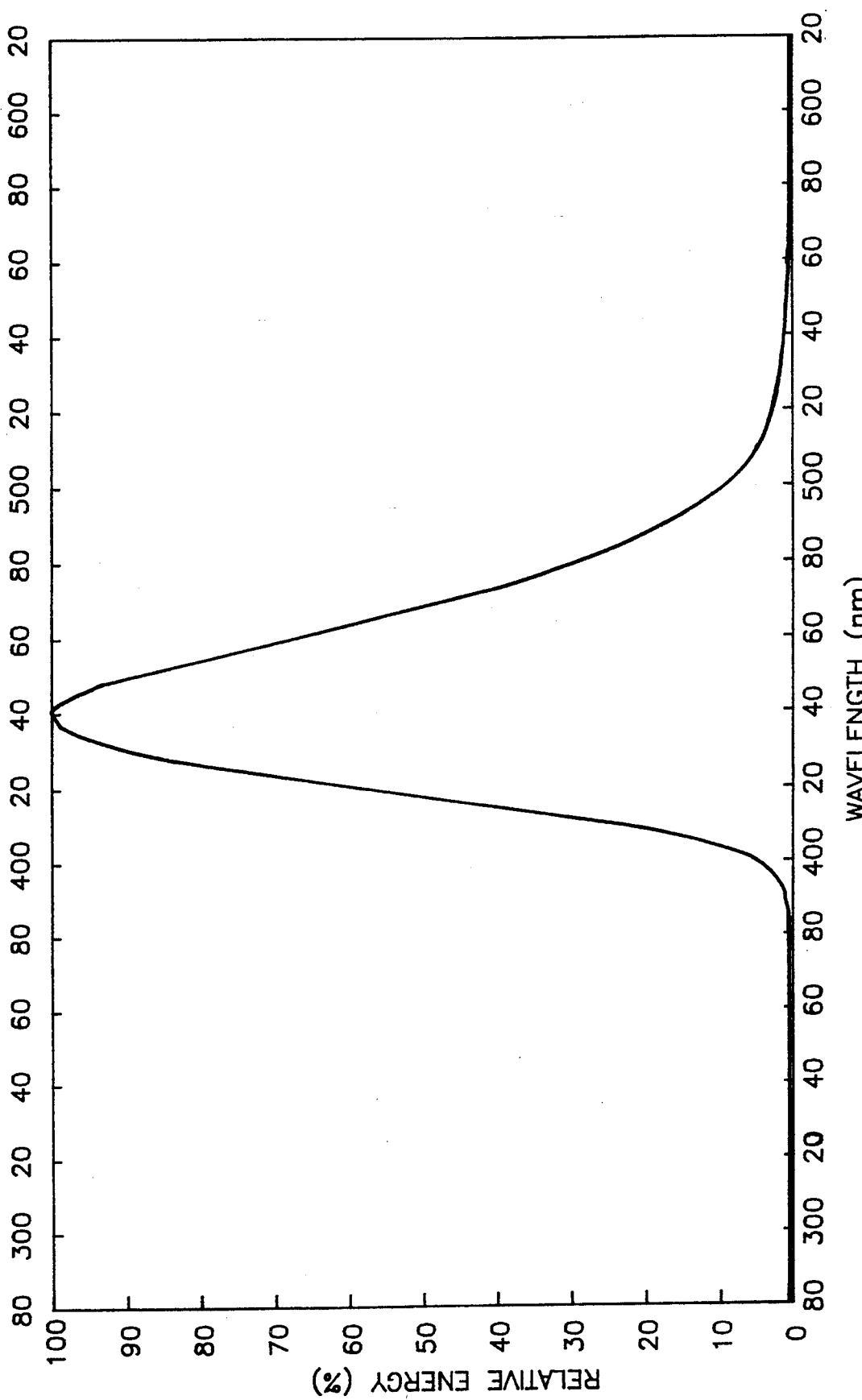
FIG. 2 shows the spectral energy distribution of the emission produced by the long decay phosphor prepared in Example 1 when excited by UV radiation at 253.7 nm.
Figure 3:
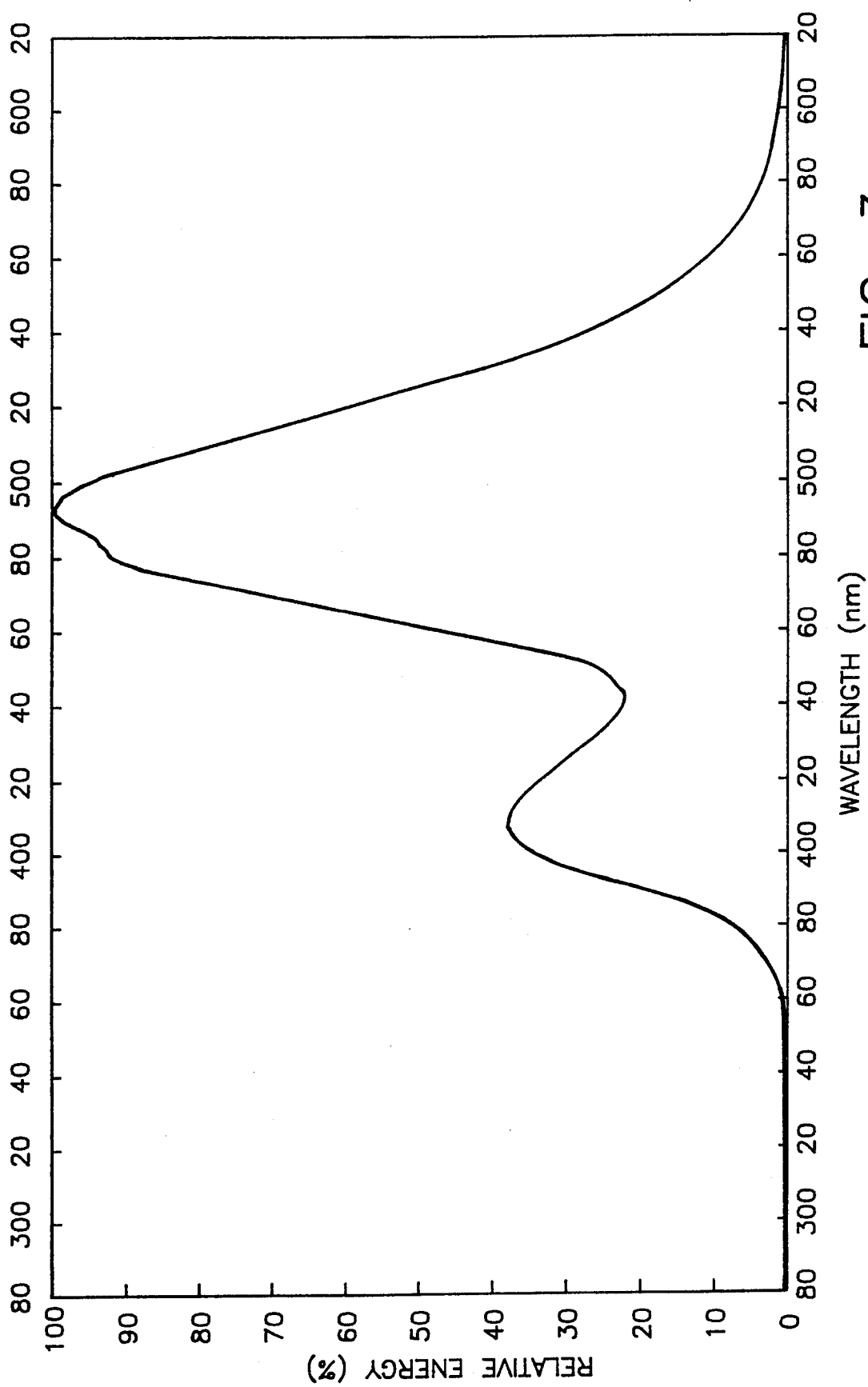
FIG. 3 shows the spectral energy distribution of the emission produced by the long decay phosphor prepared in Example 2 when excited by UV radiation at 253.7 nm.
Figure 4:
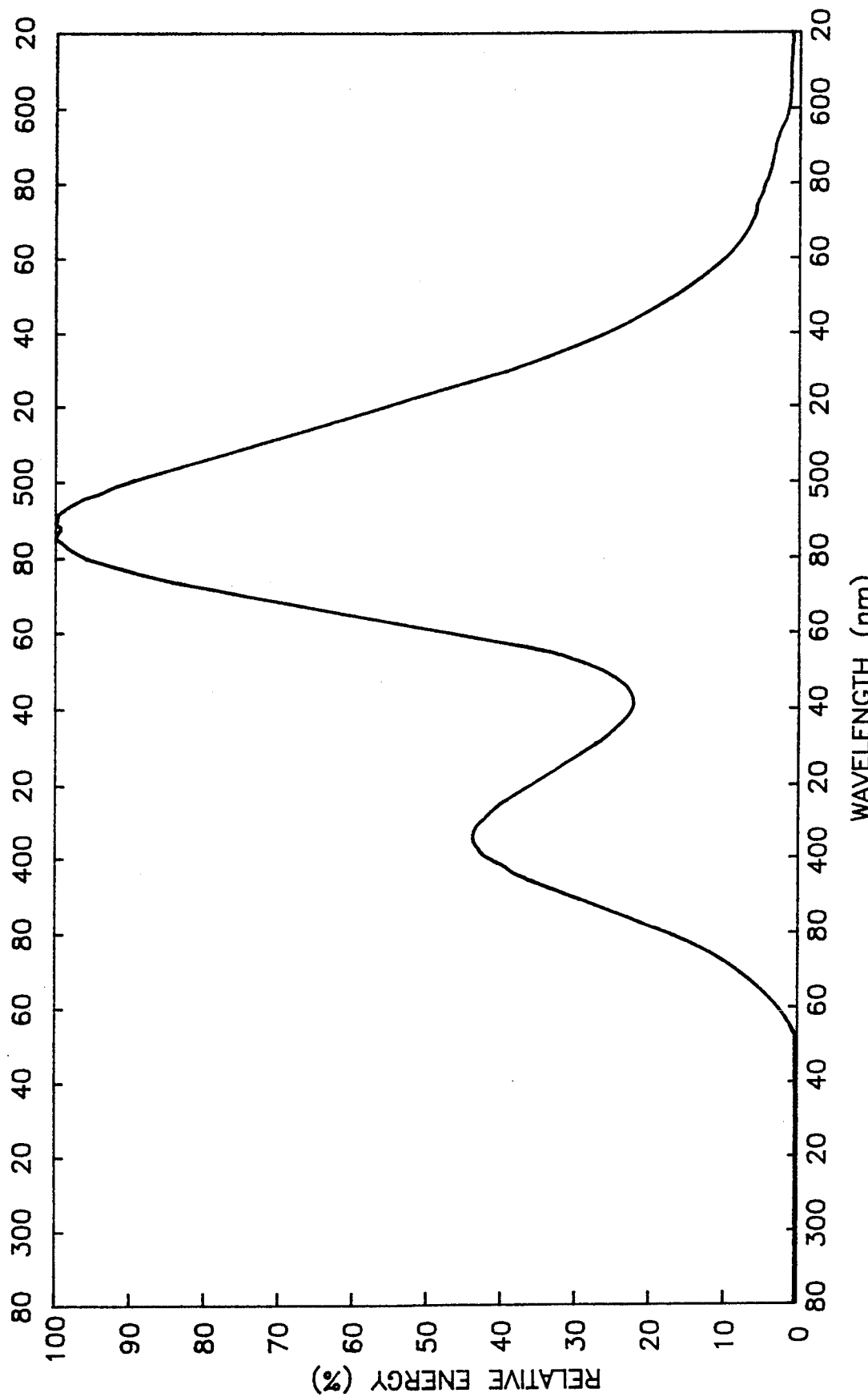
FIG. 4 shows the spectral energy distribution of the emission produced by the long decay phosphor prepared in Example 3 when excited by UV radiation at 253.7 nm.
Figure 5:
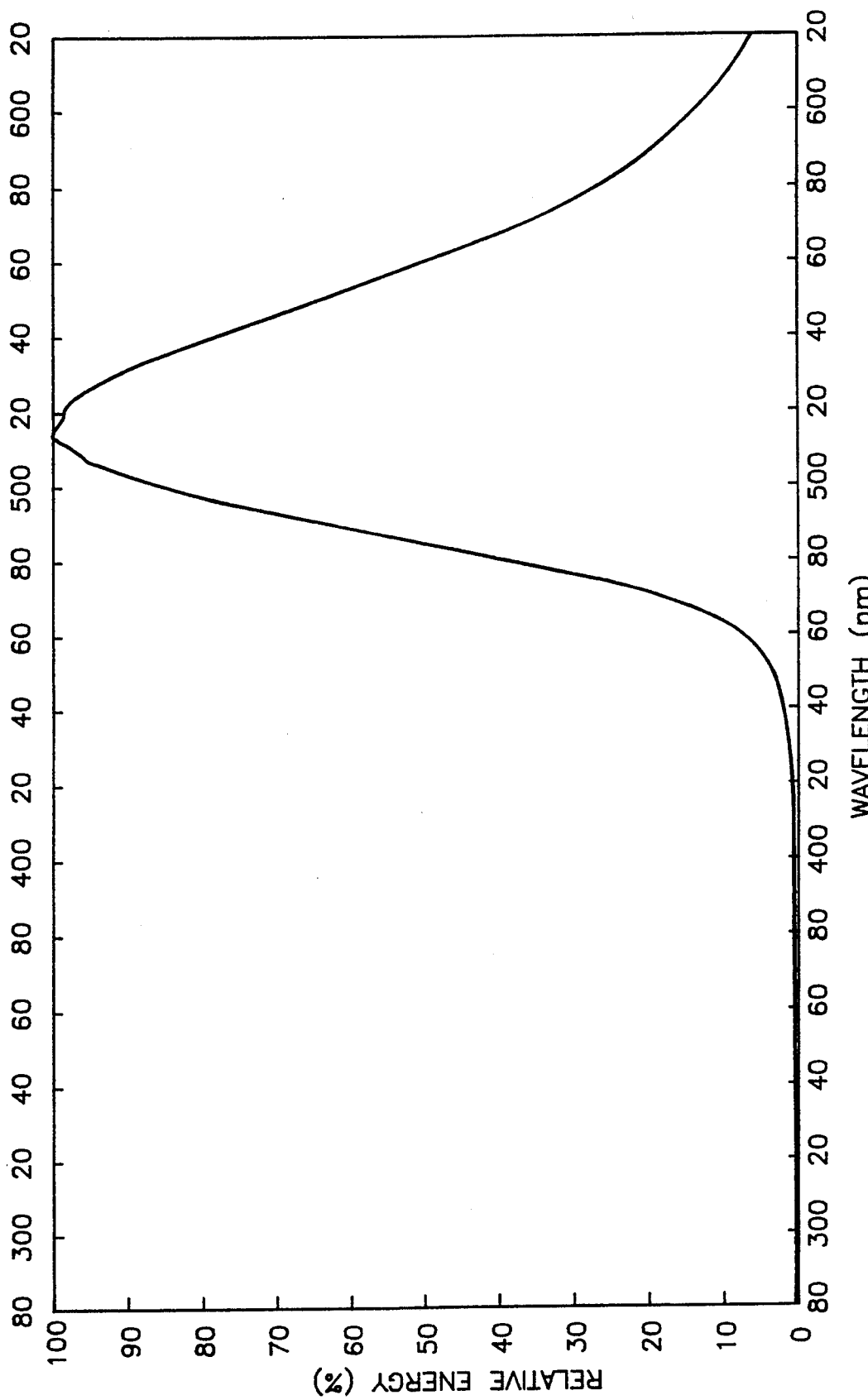
FIG. 5 shows the spectral energy distribution of the emission produced by the long decay phosphor prepared in Example 4 when excited by UV radiation at 253.7 nm.

The long decay phosphors of the subject invention are comprised of rare-earth activated, divalent aluminates wherein the aluminates are partially substituted with boron oxide, as represented by the following composition:

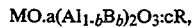  (I)

wherein $0.5 \leq a \leq 10.0$,
$0.0001 \leq b \leq 0.5$ and
$0.0001 \leq c \leq 0.2$.

It is to be understood that the above formula (I) and similar formulas as disclosed herein are intended to represent the ratio of elemental constituents present in the long decay phosphor without necessarily suggesting or representing the molecular composition of the individual crystal phases present in the subject long decay phosphors. The divalent metal oxide component in the divalent aluminate, as represented by MO in formula (I), is a divalent metal oxide selected from the group consisting of MgO, CaO, SrO and ZnO. The rare-earth metal, as represented by R in formula (I), is Eu and at least one additional rare earth element. Preferably, R represents Eu and at least one additional rare earth element selected from the group consisting of Pr, Nd, Dy and Tm. The long decay phosphors of the subject invention are disclosed to produce phosphorescence with unexpectedly high brightness for unexpectedly long decay periods.

Long decay phosphorescence is herein understood to refer to spectral emission that can be readily perceived for periods of at least 20 minutes and, preferably, for several hours, after removal of the excitation source. The excitation source may produce excitation by electromagnetic radiation, such as x-rays, sunlight or the radiation from artificial light sources. In addition, the excitation may be provided by electron beams.

The phosphorescent characteristics of a particular phosphor can be determined by measuring the phosphorescent emission data which may be represented either by exponential-type decay of the emission such that $$I_t = I_o e^{-\alpha t},$$

or by power-law type decay of the emission such that $$I_t = I_o t^{-n},$$

where "$I_t$" is the relative phosphorescent intensity at time "t", $I_o$ is the relative phosphorescent intensity at t=0 seconds, i.e. at the instant when the excitation source is removed, and "$\alpha$" and "n" may be empirically established as the "decay time constant" for each type of decay. The decay time constant may be determined by appropriately plotting the phosphorescent emission as a function of time. For emission obeying the power-law type of decay, the smaller the value of "n" for a given phosphor, the longer the decay characteristic of the phosphor. The relative phosphorescent intensity may be referred to as the "phosphorescent brightness."

For oxygen-dominated phosphor compositions, one skilled in the art would normally expect the phosphorescent emission to exhibit exponential-law type decay characteristics. The oxygen-dominated phosphor compositions of the subject invention surprisingly displayed power-law decay characteristics.

The phosphorescent brightness measurements, as disclosed herein, were carried out with well-quenched phosphor samples that had previously been placed in a dark place for many hours so as to emit all stored energy. Then, the samples were irradiated, for example, by an ultraviolet light source (365.0 nm) for about 4 minutes to achieve steady state excitation. After stopping irradiation, the phosphorescent brightness was measured as the relative percent brightness as compared to a ZnS:Cu,Cl standard.

While it was known in the prior art that rare-earth activated alkaline-earth aluminates may function as phosphors having a long decay period as compared to ZnS:Cu,Cl, it was discovered and is disclosed herein that the duration and brightness of long decay phosphors comprised of rare-earth activated, divalent aluminates can be surprisingly enhanced for compositions wherein a boron-containing compound such as boric acid is used as the flux material to prepare the phosphor. While the subject invention is not intended to be limited by the current theories or beliefs disclosed herein and although it has not yet been confirmed, it is believed that the enhanced long term phosphorescence is achieved for compositions wherein most, if not all, the boron-containing flux material becomes incorporated into the host crystal phosphor.

Furthermore, it is believed that the enhanced long decay properties are achieved for the subject rare-earth activated, divalent, boron-substituted aluminate compositions because they are prepared in the substantial absence of fluxes that contain an alkali metal and/or a halide. Aluminate-based phosphors are typically prepared using fluxes that contain an alkali metal compound, an alkaline-earth halide or an aluminum halide. The subject invention is directed to aluminate phosphors prepared using a boron-containing flux that is substantially free of any halide.

Preferably, the subject aluminate phosphors are prepared using a flux of boric acid or boric oxide that has a low alkali metal content. However, it is possible that an alkali metal borate may be used as the flux to produce acceptable phosphorescence even though with reduced performance as compared to fluxes substantially free of alkali metal. Table 1 shows substantial improvement, for example, for the phosphorescent brightness of compositions prepared using a boric acid flux as compared to divalent aluminate compositions prepared using a flux that includes an alkali metal or a halide. Based on results such as these, it is believed that the boric acid used in the preparation of the subject compositions serves the dual purpose of functioning as a flux during preparation of the phosphors as well as becoming incorporated into the chemical structure of the long decay phosphor, such as illustrated by formula (I).

It is believed that substitution of boron in the aluminate structure assists in obtaining better crystallinity of the subject divalent aluminate phosphors and in stabilizing the luminescent centers and trapping sites produced in the subject phosphors. It is further believed that the improved crystallinity and stabilization of the subject long decay phosphors is related to the fact that boron oxide can form a eutectic mixture with an alkaline-earth metal or zinc oxide and, in addition, to the fact that boron oxide may be mixed with aluminum oxide over a broad range of proportions. Preferably, the boron-containing compound is boric acid, boric oxide or an alkaline earth borate. Most preferably, the boron-containing compound is boric acid. The boron-containing compound may be present in an amount such as to produce from about 0.01 mole percent to about 50 mole percent boron as compared to the total molar content of aluminum and boron in the product phosphor. Preferably, the boron-containing compound is present in an amount such as to produce from about 0.1 mole percent to about 10 mole percent boron in the product phosphor. Most preferably, the boron-containing compound is present in an amount such as to produce about 1 to about 10 mole percent boron in the product phosphor.

Table 2 shows the relative phosphorescent brightness of Eu/Pr-activated strontium aluminate as compared to Eu/Pr-activated, boron-substituted, strontium aluminates. In the results shown in Table 2, the boron content was increased from about 0.012 moles to about 0.199 moles as compared to the total molar content of aluminum and boron combined. For a boron content of about 0.048 moles, the boron-substituted aluminates showed substantially higher phosphorescent brightness as compared to boron-free strontium aluminate.

As shown in Table 2, the main crystal structures of the host crystal, which can be identified from the x-ray diffraction patterns, have not yet been identified for all compositions. Table 3 shows the x-ray diffraction data for the rare-earth activated, boron-substituted. strontium aluminate as prepared in Example 2. The structure appears to be different from any known strontium aluminate or strontium borate as reported in the International Centre for Diffraction data. It is believed that alkaline earth aluminates modified due to boron substitution are the host crystals of this new phosphorescent phosphor. In particular, it is believed that strontium aluminate modified due to boron substitution is the host crystal of the phosphorescent phosphor prepared in Example 2.

It has also been discovered that, while it was known in the prior art that $Eu^{2+}$ could be used as the single rare-earth activator present in a divalent aluminate, enhanced long decay phosphorescence can be observed if the $Eu^{2+}$ activator is combined with a second rare-earth activator. Preferably, the second rare-earth activator is selected from the group consisting of Pr, Nd, Dy and Tm. Although it is believed that the divalent $Eu^{2+}$ functions mainly as a luminescent center, whereas the second rare-earth activator may serve as a trapping site, it has not yet been confirmed which function each activator fulfills in the present phosphors. In particular, it was discovered that while $Eu^{2+}$ may form trapping sites in the host divalent aluminate crystals of the subject invention, these trapping sites were not sufficiently long-lasting for use in actual night-luminous applications. Long decay phosphorescence could be surprisingly enhanced by including an additional rare-earth activator.

Phosphorescent phosphor quality may be characterized in terms of "decay time constant" and "phosphorescent brightness." These two factors strongly depend on the concentration of both the luminescent centers and the trapping sites. If the concentration of the luminescent center is small as compared to the trapping site, the phosphorescence endures longer and the decay time constant becomes smaller. However, if the decay constant is small, the phosphorescent brightness is less. If the concentration of the luminescent center is too small, uniform emission may not be obtained. Alternatively, if the concentration of the luminescent center is larger, a higher initial phosphorescent output may be achieved, but the phosphorescence may decay too quickly and the decay time constant becomes larger.

Similar effects may be observed depending on the trapping site concentration. Thus, a low trapping site concentration results in a shorter decay and a larger decay time constant and a high trapping site concentration results in a longer decay and a smaller decay constant. However, if the trapping site concentration becomes too large, the high concentration of activator may result in concentration quenching. For example, in the case of the yellow-green long decay phosphor when the $Eu^{2+}$ concentration (luminescent center) is 6 times larger than Example 4, the decay time constant $n=0.98$ and the phosphorescent brightness, as compared to $ZnS:Cu,Cl$, is 279% at 10 seconds and 1160% at 20 minutes after excitation.

The proper concentrations for both the luminescent center and the trapping site should be optimized depending on the requirements of the applications. Preferably, the concentration of the rare earth that functions as a luminescent center and the additional rare-earth that functions as a trapping site are each in the range between 0.0001 mole and 0.1 mole of divalent metal element. More preferably, each rare-earth ion should be in the range between 0.01 mole and 0.05 mole of divalent metal element.

Table 4 shows the composition, spectral emission characteristics and color of subject long decay phosphors containing $Eu^{2+}$ plus the additional rare-earth activator, as disclosed in Examples 1-4. It is preferred that the combination of rare-earth elements be selected in accord with the host crystal in which the combination is to be included. The empirically determined decay time constant and phosphorescent brightness are disclosed in Table 5 at 10 seconds and 20 minutes after excitation for the long decay phosphors of Examples 1-4. The phosphorescent brightness is presented in terms of the relative phosphorescent intensity as compared to a $ZnS:Cu,Cl$ phosphor. Table 5 shows subject phosphorescent phosphors having both a long decay characteristic as well as high phosphorescent brightness. The result is that phosphorescence may be observed for periods of many hours, in particular, for periods of up to about 10 hours or more.

One of the preferred embodiments of the subject invention is a long decay phosphor of formula (I) wherein $0.6 \leq a \leq 1.5$,
$0.001 \leq b \leq 0.1$ and
$0.002 \leq c \leq 0.1$ and MO represents from 70 to 100 mole percent CaO, relative to the total divalent metal oxide content, and from 0 to 30 mole percent of a divalent metal oxide selected from the group consisting of MgO, SrO and ZnO. Most preferably, this embodiment includes from 0 to 30 mole percent SrO.

Another of the preferred embodiments of the subject invention is a long decay phosphor of formula (I) wherein $0.6 \leq a \leq 1.5$,
$0.001 \leq b \leq 0.1$ and
$0.001 \leq c \leq 0.1$.

Still another of the preferred embodiments of the subject invention is a long decay phosphor of formula (I) wherein $1.5 \leq a \leq 3,0$,
$0.001 \leq b \leq 0.1$ and
$0.001 \leq c \leq 0.1$ and MO represents from 70 to 100 mole percent SrO, relative to the total divalent metal oxide content, and 0 to 30 mole percent of the divalent metal oxide selected from the group consisting of MgO, CaO and ZnO. Most preferably, this embodiment includes from 0 to 30 mole percent CaO.

The raw materials that are used in the preparation of the long decay phosphors of the subject invention are high purity materials having a purity of at least 99.9%. Preferably, the purity is greater than 99.99%. The raw materials are selected such that the raw materials do not react to produce any other components in the long decay phosphor product, except those components that are intended to form part of the chemical composition of the desired phosphor product. For example, $SrCO_3$ may typically contain excess carbonate in the raw material composition, but the excess carbonate fraction can be readily burned out during the firing process. Other inorganic or organic compounds may be used as the raw material so long as the raw material composition provides only the desired components in the long decay phosphors without also providing other undesired components. Examples of such desired compounds include carbonates, nitrates, oxalates, hydrates, etc. Examples of flux compounds that may produce undesired components in the product phosphor include compounds containing alkali-metals and/or halides.

As the raw material that is to be used for providing the divalent metal in the divalent metal aluminate, carbonate salts or oxides of alkaline earth elements and of zinc may be used because of their reactivity, ease of handling and commercial availability in high purity. High purity $Al_2O_3$ may be used as the $Al_2O_3$ source for the same reasons. However, $Al(NO_3)_3 \cdot 9H_2O$ may also be used instead of $Al_2O_3$. Boric acid, boron oxide or an alkaline earth borate is preferably used as the source of boron. Boron oxide is believed to help crystal growth and remain in the phosphor to improve the phosphorescence decay characteristics. Preferably, use of a flux based on an alkali metal compound and/or a halide is to be avoided since these materials decrease the decay time and the phosphorescent brightness of long decay phosphors. Rare earth oxalate salts are preferably used as the source of the rare earth activator.

These materials may be weighed and mixed in either a dry or wet mixing process in order to get a well blended uniform raw material mixture. The wet mixture is dried in an oven and sieved for firing. The mixture is then fired in a mildly reducing atmosphere using methods known to one skilled in the art. For example, the mixture may be fired in a mildly reducing atmosphere at 1200°–1500° C. for about 1–6 hours. The time schedule of the firing may be adjusted so as to improve the decay properties. The fired material is pulverized and sieved for carrying out the phosphorescent measurements.

This invention will now be described in detail with respect to the specific preferred embodiments thereof, it being understood that the materials and the process steps of the following examples are intended to be illustrative only. The invention is not intended to be limited to the materials, conditions, process parameters and the like recited herein.

EXAMPLES OF THE PREFERRED EMBODIMENTS

Example 1

A blue emitting long decay phosphor having a composition of

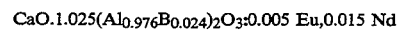

$CaO \cdot 1.025(Al_{0.976}B_{0.024})_2O_3 : 0.005\ Eu, 0.015\ Nd$ was prepared by starting from a mixture of:

| | |
|---|---|
| $CaCO_3$ | 10.009 g |
| $Eu_2(C_2O_4)_3 \cdot 10H_2O$ | 0.187 g |
| $Nd_2O_3$ | 0.252 g |
| $Al_2O_3$ | 10.196 g |
| $H_3BO_3$ | 0.309 g |

The mixture was fired in a furnace for 4 hours in a mildly reducing atmosphere at 1300° C. After cooling, the product obtained was ground and sieved for evaluation.

The particle size, emission spectrum, color coordinates, and decay characteristics under photoexcitation were measured using methods known to one skilled in the art. The particle size of this material was about 11.3 μm and the emission peak was at about 440 nm.

Example 2

A blue-green emitting long decay phosphor having a composition of

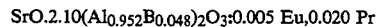

$SrO \cdot 2.10(Al_{0.952}B_{0.048})_2O_3 : 0.005\ Eu, 0.020\ Pr$ was prepared by starting from a mixture of:

| | |
|---|---|
| $SrCO_3$ | 7.381 g |
| $Eu_2(C_2O_4)_3 \cdot 10H_2O$ | 0.094 g |
| $Pr_6O_{11}$ | 0.170 g |
| $Al_2O_3$ | 10.196 g |
| $H_3BO_3$ | 0.618 g |

The mixture was fired in a furnace for 2 hours in a mildly reducing atmosphere at 1350° C. in a manner similar to that described in Example 1.

The particle size of this material was about 17.5 μm and emission peaks were observed at about 494 nm and 407 nm. This material had a relatively rapid phosphorescent rise time and a bright initial emission.

Example 3

A blue-green emitting long decay phosphor having a composition of $SrO.2.10(Al_{0.952}B_{0.048})_2O_3:0.005\ Eu, 0.020\ Dy$ was prepared by starting from a mixture of:

| | |
|---|---|
| SrCO$_3$ | 7.381 g |
| Eu$_2$(C$_2$O$_4$)$_3$.10H$_2$O | 0.094 g |
| Dy$_2$O$_3$ | 0.187 g |
| Al$_2$O$_3$ | 10.196 g |
| H$_3$BO$_3$ | 0.618 g |

The mixture was fired in a furnace for 2 hours in a mildly reducing atmosphere at 1350° C. in a manner similar to that described in Example 1.

The particle size of this material was about 18.6 μm and emission peaks were observed at about 490 nm and 403 nm. This material had a relatively slow rise time, however, emission lasted for a very long time period.

Example 4

A yellow-green emitting long decay phosphor having a composition of $SrO.1.025(Al_{0.976}B_{0.024})_2O_3:0.005\ Eu, 0.015\ Dy$ was prepared by starting from a mixture of:

| | |
|---|---|
| SrCO$_3$ | 14.763 g |
| Eu$_2$(C$_2$O$_4$)$_3$.10H$_2$O | 0.187 g |
| Dy$_2$O$_3$ | 0.281 g |
| Al$_2$O$_3$ | 10.196 g |
| H$_3$BO$_3$ | 0.309 g |

The mixture was fired in a furnace for 2 hours in a mildly reducing atmosphere at 1350° C. in a manner similar to that described in Example 1.

The particle size of this material was about 12.5 μm and emission peak was observed at about 515 nm.

TABLE 1

| | Phosphor composition | Flux | Measured phosphorescent brightness* | Flux amount (mole % of CaO) |
|---|---|---|---|---|
| Ex. 1 | CaO.1.025(Al$_{0.976}$B$_{0.024}$)$_2$O$_3$: 0.005 Eu, 0.015 Nd | H$_3$BO$_3$ | 100 (%) | — |
| | CaO.Al$_2$O$_3$: 0.005 Eu, 0.015 Nd | Na$_2$CO$_3$ | 11 | 2.5 |
| | CaO.Al$_2$O$_3$: 0.005 Eu, 0.015 Nd | NH$_4$Cl | 8 | 7.5 |
| | CaO.Al$_2$O$_3$: 0.005 Eu, 0.015 Nd | AlF$_3$3H$_2$O | 20 | 2.5 |
| | CaO.1.025(Al$_{0.976}$B$_{0.024}$)$_2$O$_3$: 0.005 Eu, 0.015 Nd | Na$_2$CO$_3$ | 89 | 1.25 |
| | CaO.1.025(Al$_{0.976}$B$_{0.024}$)$_2$O$_3$: 0.005 Eu, 0.015 Nd | NH$_4$Cl | 49 | 3.75 |
| | CaO.1.025(Al$_{0.976}$B$_{0.024}$)$_2$O$_3$: 0.005 Eu, 0.015 Nd | Na$_2$CO$_3$ + NH$_4$Cl | 50 | 1.25 + 3.75 |
| | CaO.1.025(Al$_{0.976}$B$_{0.024}$)$_2$O$_3$: 0.005 Eu, 0.015 Nd | AlF$_3$.3H$_2$O | 30 | 1.25 |
| | CaO.1.025(Al$_{0.976}$B$_{0.024}$)$_2$O$_3$: 0.005 Eu, 0.015 Nd | Na$_2$B$_4$O$_6$.10H$_2$O | 75 | 1.25 |

*The phosphorescent brightness was measured as the relative brightness as compared to the phosphorescence of the phosphor of Ex. 1 after the same time interval since the excitation source was removed.

TABLE 2

| | Phosphor composition | The primary crystal structure of the host crystal: | Measured phosphorescent brightness* |
|---|---|---|---|
| | SrO.2.0Al$_2$O$_3$: 0.0005 Eu, 0.020 Pr | SrAl$_4$O$_7$ | 0.5 % |
| | SrO.2.025(Al$_{0.988}$B$_{0.012}$)$_2$O$_3$: 0.005 Eu, 0.020 Pr | SrAl$_4$O$_7$ | 22 |
| | SrO.2.050(Al$_{0.976}$B$_{0.024}$)$_2$O$_3$: 0.005 Eu, 0.020 Pr | unknown | 73 |
| Ex. 2 | SrO.2.10(Al$_{0.952}$B$_{0.048}$)$_2$O$_3$: 0.005 Eu, 0.020 Pr | unknown | 100 |
| | SrO.2.56(Al$_{0.801}$B$_{0.199}$)$_2$O$_3$: 0.005 Eu, 0.020 Pr | unknown | 0.5 |

*The phosphorescent brightness was measured as the relative brightness as compared to the phosphorescence of the phosphor of Ex. 2 after the same time interval since the excitation source was removed.

TABLE 3

| dÅ | I (%) | dÅ | I (%) |
|---|---|---|---|
| 12.27 | 11 | 2.330 | 28 |
| 6.18 | 10 | 2.287 | 13 |
| 4.188 | 15 | 2.220 | 33 |
| 4.110 | 16 | 2.189 | 36 |
| 4.001 | 39 | 2.115 | 52 |
| 3.759 | 15 | 2.111 | 47 |
| 3.490 | 100 | 2.047 | 12 |
| 3.184 | 97 | 2.007 | 35 |
| 2.976 | 16 | 2.001 | 37 |
| 2.948 | 35 | 1.939 | 17 |
| 2.833 | 98 | 1.852 | 26 |
| 2.774 | 20 | 1.744 | 19 |
| 2.744 | 9 | 1.729 | 17 |
| 2.680 | 12 | 1.574 | 17 |
| 2.620 | 42 | 1.545 | 73 |
| 2.605 | 80 | 1.541 | 44 |
| 2.493 | 51 | 1.432 | 41 |
| 2.476 | 43 | 1.411 | 18 |
| 2.440 | 30 | 1.399 | 14 |
| 2.389 | 14 | 1.390 | 17 |
| 2.371 | 20 | 1.242 | 15 |

X-ray diffraction data for the rare-earth activated, boron-substituted, strontium aluminate as prepared in Ex. 2.

TABLE 4

| | | Emission color | | | |
|---|---|---|---|---|---|
| | Composition | x value | y value | $\lambda_{max}$ (nm) | color |
| Ex. 1 | CaO.1.025(Al$_{0.976}$B$_{0.024}$)$_2$O$_3$: 0.005 Eu, 0.015 Nd | 0.154 | 0.040 | 440 | Purplish blue |
| Ex. 2 | SrO.2.1(Al$_{0.952}$B$_{0.048}$)$_2$O$_3$: 0.005 Eu, 0.020 Pr | 0.141 | 0.370 | 494, 407 | Blue-green |
| Ex. 3 | SrO.2.1(Al$_{0.952}$B$_{0.048}$)$_2$O$_3$: 0.005 Eu, 0.020 Dy | 0.142 | 0.360 | 490, 403 | Blue-green |
| Ex. 4 | SrO.1.025(Al$_{0.976}$B$_{0.024}$)$_2$O$_3$: 0.005 Eu, 0.015 Dy | 0.266 | 0.577 | 515 | Yellow-green |

TABLE 4-continued

| Composition | Emission color | | | |
|---|---|---|---|---|
| | x value | y value | $\lambda_{max}$ (nm) | color |
| ZnS: Cu,Cl | 0.288 | 0.590 | 520 | Yellow-green |

TABLE 5

| Phosphor composition | Decay Time Constant ("n") | Phosphorescent Brightness* | |
|---|---|---|---|
| | | after 10 sec. | after 20 min. |
| Ex. 1 CaO.1.025($Al_{0.976}B_{0.024})_2O_3$: 0.005 Eu, 0.015 Nd | 0.81 | 11 (%) | 82 (%) |
| Ex. 2 SrO.2.1($Al_{0.952}B_{0.048})_2O_3$: 0.005 Eu, 0.020 Pr | 0.99 | 78 | 274 |
| Ex. 3 SrO.2.1($Al_{0.952}B_{0.048})_2O_3$: 0.005 Eu, 0.020 Dy | 0.94 | 144 | 934 |
| Ex. 4 SrO.1.025($Al_{0.976}B_{0.024})_2O_3$: 0.005 Eu, 0.015 Dy | 0.86 | 220 | 1320 |
| ZnS: Cu,Cl | 1.26 | 100 | 100 |

*The phosphorescent brightness was measured as the relative brightness as compared to the phosphorescence of ZnS:Cu,Cl after the same time interval since the excitation source was removed.

What is claimed is:

1. A long decay phosphor comprising a composition of $$MO.a(Al_{1-b}B_b)_2O_3:cR,$$

wherein
$0.5 \leq a \leq 10.0$,
$0.0001 \leq b \leq 0.5$,
$0.0001 \leq c \leq 0.2$,
MO represents at least one divalent metal oxide selected from the group consisting of MgO, CaO, SrO and ZnO and R represents $E^{2+}$ and at least one additional rare earth element selected from the group consisting of Pr, Nd, Dy and Tm, the additional rare earth element being present in an amount sufficient to effect enhanced long decay phosphorescence.

2. The long decay phosphor of claim 1 wherein MO represents at least one divalent metal oxide selected from the group consisting of CaO and SrO.

3. The long decay phosphor of claim 1 wherein R represents $Eu^{2+}$ and Pr.

4. The long decay phosphor of claim 1 wherein R represents $Eu^{2+}$ and Nd.

5. The long decay phosphor of claim 1 wherein R represents $Eu^{2+}$ and Dy.

6. The long decay phosphor of claim 1 wherein R represents $Eu^{2+}$ and Tm.

7. The long decay phosphor of claim 1 wherein
$0.6 \leq a \leq 1.5$,
$0.001 \leq b \leq 0.1$ and
$0.002 \leq c \leq 0.1$ and
MO represents from 70 to 100 mole percent CaO, relative to the total divalent metal oxide content, and 0 to 30 mole percent of a divalent metal oxide selected from the group consisting of MgO, SrO and ZnO.

8. The long decay phosphor of claim 7 wherein MO represents from 70 to 100 mole percent CaO, relative to the total divalent metal oxide content, and 0 to 30 mole percent SrO.

9. The long decay phosphor of claim 7 wherein said composition comprises:

$$CaO.1.025(Al_{0.976}B_{0.024})_2O_3:0.005\ Eu^{2+},\ 0.015\ Nd.$$

10. The long decay phosphor of claim 7 wherein R represents $Eu^{2+}$ and Nd.

11. The long decay phosphor of claim 7 wherein R represents $Eu^{2+}$ and Tm.

12. The long decay phosphor of claim 1 wherein
$1.5 \leq a \leq 3.0$,
$0.001 \leq b \leq 0.1$ and
$0.001 \leq c \leq 0.1$ and
MO represents from 70 to 100 mole percent SrO, relative to the total divalent metal oxide content, and 0 to 30 mole percent of the divalent metal oxide selected from the group consisting of MgO, CaO and ZnO.

13. The long decay phosphor of claim 12 wherein MO represents from 70 to 100 mole percent SrO, relative to the total divalent metal oxide content, and 0 to 30 mole percent CaO.

14. The long decay phosphor of claim 12 wherein said composition comprises $$SrO.2.10(Al_{0.952}B_{0.048})_2O_3:0.005\ Eu^{2+},\ 0.020\ Dy.$$

15. The long decay phosphor of claim 12 wherein said composition comprises $$SrO.2.10(Al_{0.952}B_{0.048})_2O_3:0.005\ Eu^{2+},\ 0.020\ Dy.$$

16. The ions decay phosphor of claim 12 wherein R represents $Eu^{2+}$ and Pr.

17. The long decay phosphor of claim 12 wherein R represents $Eu^{2+}$ and Dy.

18. The long decay phosphor of claim 1 wherein
$0.6 \leq a \leq 1.5$,
$0.001 \leq b \leq 0.1$, and
$0.001 \leq c \leq 0.1$.

19. The long decay phosphor of claim 18 wherein MO represents at least one divalent metal oxide selected from the group consisting of CaO and SrO.

20. The long decay phosphor of claim 18 wherein said composition comprises $$SrO.1.025(Al_{0.976}B_{0.024})_2O_3:0.005\ Eu^{2+},\ 0.015\ Dy.$$

21. The long decay phosphor of claim 18 wherein R represents $Eu^{2+}$ and Dy.

* * * * *

UNITED STATES PATENT AND TRADEMARK OFFICE
CERTIFICATE OF CORRECTION

PATENT NO. : 5,376,303
DATED : December 27, 1994
INVENTOR(S) : Martin R. Royce, et al It is certified that error appears in the above-indentified patent and that said Letters Patent is hereby corrected as shown below:

On the title page, items

[54] "PHOAPHORS" should be --PHOSPHORS--;

[22] "Jan. 10, 1994" should be --June 10, 1994--;

[56] References Cited: Please add the following:

-- U.S. Patent Documents

| | | | |
|---|---|---|---|
| 2,392,814 | 1/1946  | Froelich............252/301.4 R |
| 3,294,699 | 12/1966 | Lange...............252/301.4 R |
| 3,657,138 | 4/1972  | Royce...............252/301.4 R |
| 4,216,408 | 8/1980  | Verstegen et al.....313/468 |
| 4,524,300 | 6/1985  | Rutten et al........313/487 |
| 5,049,779 | 9/1991  | Itsuki et al........313/486 |
| 5,166,456 | 11/1992 | Yoshino.............252/301.4 R |

UNITED STATES PATENT AND TRADEMARK OFFICE
CERTIFICATE OF CORRECTION

PATENT NO. : 5,376,303
DATED : December 27, 1994
INVENTOR(S) : Martin R. Royce, et al It is certified that error appears in the above-indentified patent and that said Letters Patent is hereby corrected as shown below:

Other References

Translation of the Extended Abstract of the 248th Keikoutai Dougakkai Kouen Yokou, November 26, 1993.

A New Nonradioactive Night-Luminous Phosphor, Journal of Luminescence 40 & 41 (1988) 891-892, North-Holland Amsterdam.

Extension of Phosphorescence Decay Time of CaS:Mn Phosphor, J. Electrochem. Soc., Vol. 136, No. 4, April 1989, The Electrochemical Society, Inc.

Study On Effect Of Rare Earth In Blue-Purple Night-Luminous Phosphor CaS:Bi,Cu, Acta Sci. Nat. Univ. Norm Hunan (Hunan Shifan Daxue, Ziran Kexue Xuebao) Vol. 15, No. 2, pp 145-148, June 1992.

UNITED STATES PATENT AND TRADEMARK OFFICE
CERTIFICATE OF CORRECTION

PATENT NO. : 5,376,303
DATED : December 27, 1994
INVENTOR(S) : Martin R. Royce, et al It is certified that error appears in the above-indentified patent and that said Letters Patent is hereby corrected as shown below:

Rare Earth Effect In Non-Radioactive Night Luminous Phosphor ZnS:Pb, Cu, Human Shifan Daxue, Ziran Kexue Xuebao, Vol. 14, No. 1, pp 47-51, 1991, X. Mai and M. Hong, (Act Scientiarium Naturalium, Univ. Normalis Hunanensis). --

[57] Abstract, last line, "Pt" should be --Pr--.

Signed and Sealed this

Sixth Day of June, 1995

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,376,303
DATED : December 27, 1994
INVENTOR(S) : Martin R. Royce, et al It is certified that error appears in the above-indentified patent and that said Letters Patent is hereby corrected as shown below:

On the title page, item [22], change "Jan." to --June--.

Signed and Sealed this

Eleventh Day of July, 1995

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,376,303

DATED : December 27, 1994

INVENTOR(S) : Martin R. Royce, et al.

It is certified that error appears in the above-indentified patent and that said Letters Patent is hereby corrected as shown below:

Column 11, line 32, "$E^{2+}$" should be --$Eu^{2+}$--.

Column 12, line 39, "Dy" should be --Pr--.

Column 12, line 46, "ions" should be --long--.

Signed and Sealed this

Sixteenth Day of January, 1996

Attest:

BRUCE LEHMAN

Attesting Officer

Commissioner of Patents and Trademarks